(12) United States Patent
Chen

(10) Patent No.: US 9,300,977 B2
(45) Date of Patent: Mar. 29, 2016

(54) METHODS FOR ENCODING MOTION VECTORS

(71) Applicant: Amlogic Co., Ltd., Santa Clara, CA (US)

(72) Inventor: Shi Chen, Cupertino, CA (US)

(73) Assignee: Amlogic Co., Ltd., Santa Clara, CA (US)

( * ) Notice: Subject to any disclaimer, the term of this patent is extended or adjusted under 35 U.S.C. 154(b) by 351 days.

(21) Appl. No.: 14/044,763

(22) Filed: Oct. 2, 2013

(65) Prior Publication Data

US 2015/0092857 A1 Apr. 2, 2015

(51) Int. Cl.
| | |
|---|---|
| H04B 1/66 | (2006.01) |
| H04N 7/12 | (2006.01) |
| H04N 11/02 | (2006.01) |
| H04N 11/04 | (2006.01) |
| H04N 19/513 | (2014.01) |
| H04N 19/51 | (2014.01) |
| H04N 19/139 | (2014.01) |
| H04N 19/52 | (2014.01) |

(52) U.S. Cl.
CPC ............ *H04N 19/521* (2014.11); *H04N 19/139* (2014.11); *H04N 19/51* (2014.11); *H04N 19/513* (2014.11); *H04N 19/52* (2014.11)

(58) Field of Classification Search
None
See application file for complete search history.

(56) References Cited

U.S. PATENT DOCUMENTS

| | | | | |
|---|---|---|---|---|
| 8,116,372 B1 * | 2/2012 | Amer | ................. | H04N 19/176 375/240.01 |
| 2011/0176013 A1 * | 7/2011 | Robertson | ............. | H04N 5/145 348/208.4 |
| 2012/0230408 A1 * | 9/2012 | Zhou | ................... | H04N 19/105 375/240.15 |
| 2012/0230411 A1 * | 9/2012 | Liu | ..................... | H04N 19/176 375/240.16 |
| 2013/0070855 A1 * | 3/2013 | Zheng | ................. | H04N 19/105 375/240.16 |
| 2013/0121401 A1 * | 5/2013 | Zheludkov | ............. | H04N 19/65 375/240.02 |
| 2013/0287116 A1 * | 10/2013 | Helle | ............... | H04N 19/00072 375/240.24 |
| 2013/0343663 A1 * | 12/2013 | Sato | ........................ | G06T 9/00 382/233 |
| 2014/0092981 A1 * | 4/2014 | Lin | ........................ | H04N 19/56 375/240.16 |
| 2014/0177726 A1 * | 6/2014 | Okajima | ................ | H04N 19/52 375/240.16 |
| 2014/0211857 A1 * | 7/2014 | Sugio | ............... | H04N 19/00733 375/240.16 |
| 2014/0321548 A1 * | 10/2014 | Park | .................... | H04N 19/521 375/240.16 |
| 2015/0078450 A1 * | 3/2015 | Chen | ................ | H04N 19/00684 375/240.16 |

* cited by examiner

*Primary Examiner* — Joseph Ustaris
*Assistant Examiner* — Rebecca Volentine
(74) *Attorney, Agent, or Firm* — Venture Pacific Law, PC

(57) ABSTRACT

A method for encoding motion vectors, comprises the steps of: determining motion vectors and flags for sub-blocks of a macroblock ("MB") as a function of SAD calculations for the MB; generating one or more merged motion vectors for the sub-blocks of the MB as a function of the determined motion vectors and the determined flags; generating a merged macroblock motion vector for the MB as a function of the generated merged motion vectors and of the determined flags; and encoding the determined motion vectors as a function of the generated merged motion vectors and the generated merged macroblock motion vector.

18 Claims, 7 Drawing Sheets

| | | Flexible Flag? | Big Flag? | Any Flag? | 1 MV Merge? | Fixed Flag? | Extra Condition? | Merge? |
|---|---|---|---|---|---|---|---|---|
| Case 1 | Block 1 | - | - | - | - | Yes | MV1-MV2 < Thres1 | Yes |
| | Block 2 | Yes | - | - | - | - | | |
| Case 2 | Block 1 | Yes | - | - | - | - | MV1-MV2 < Thres2 | Yes |
| | Block 2 | Yes | - | - | - | - | | |
| Case 3 | Block 1 | (Yes) | - | - | - | (Yes) | No | Yes |
| | Block 2 | - | - | Yes | - | - | | |
| Case 4 | Block 1 | - | - | Yes | - | - | No | Yes |
| | Block 2 | - | - | Yes | - | - | | |
| Case 5 | Block 1 | - | Yes | - | - | - | Special cases? | Yes |
| | Block 2 | (Yes) | - | (Yes) | - | (Yes) | | |
| Case 6 | Block 1 | - | - | Yes | - | - | | Yes |
| | Block 2 | Yes | - | - | - | - | | |
| Case 7 | Block 1 | - | - | - | - | Yes | Special cases? | Yes |
| | Block 2 | - | - | - | - | Yes | | |
| Case 8 | Block 1 | - | - | - | Yes | - | | Yes |
| Case 9 | Block 1 | - | - | - | - | - | Glitch? | Yes |

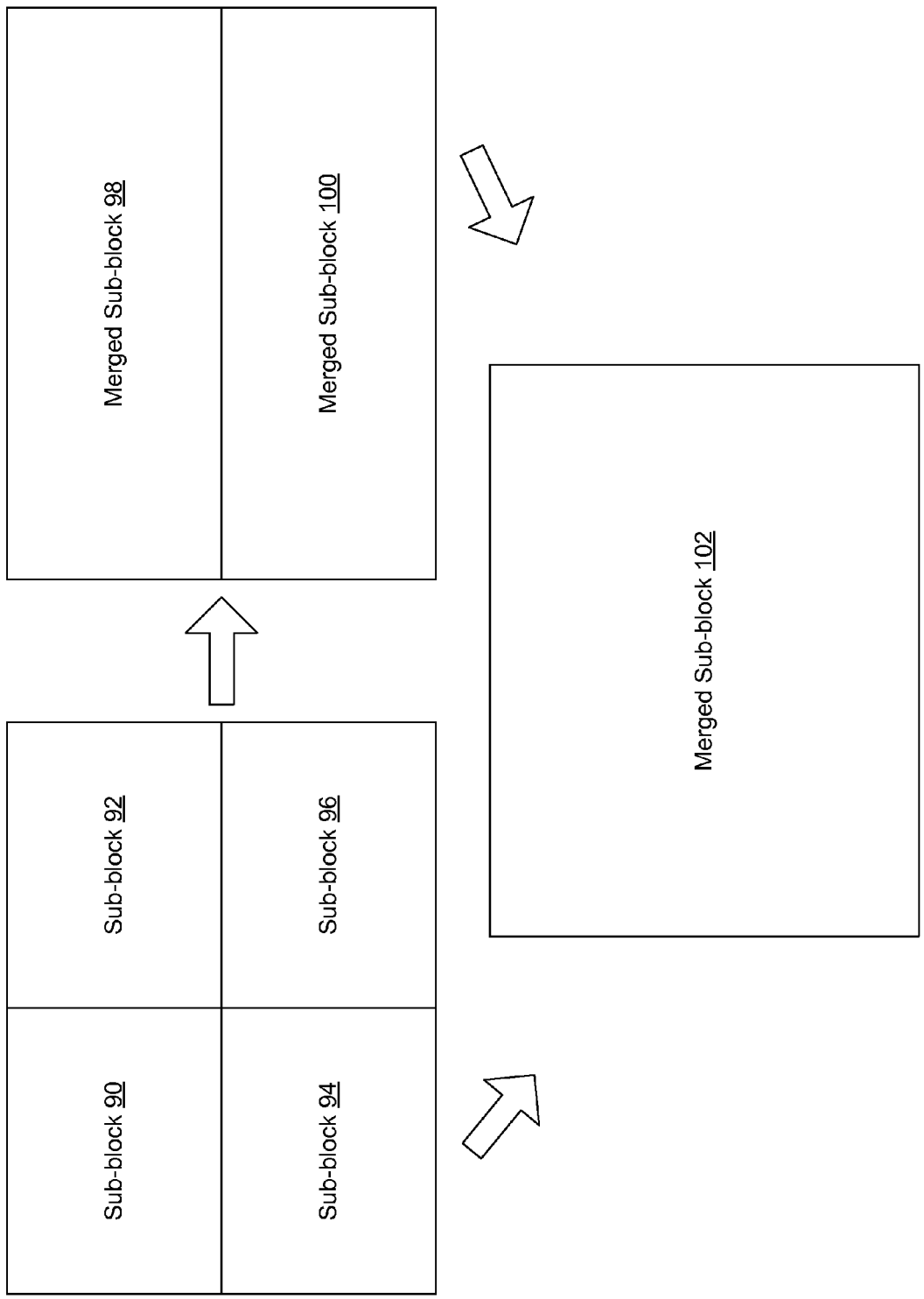

|  |  | Flexible Flag? | Big Flag? | Any Flag? | 1 MV Merge? | Fixed Flag? | Extra Condition? | Merge? |
|---|---|---|---|---|---|---|---|---|
| Case 1 | Block 1 | - | - | - | - | Yes | MV1-MV2 < Thres1 | Yes |
|  | Block 2 | Yes | - | - | - | - |  |  |
| Case 2 | Block 1 | Yes | - | - | - | - | MV1-MV2 < Thres2 | Yes |
|  | Block 2 | Yes | - | - | - | - |  |  |
| Case 3 | Block 1 | (Yes) | - | - | - | (Yes) | No | Yes |
|  | Block 2 | - | - | Yes | - | - |  |  |
| Case 4 | Block 1 | - | - | Yes | - | - | No | Yes |
|  | Block 2 | - | - | Yes | - | - |  |  |
| Case 5 | Block 1 | - | Yes | - | - | - | Special cases? | Yes |
|  | Block 2 | (Yes) | - | (Yes) | - | (Yes) |  |  |
| Case 6 | Block 1 | - | - | Yes | - | - |  | Yes |
|  | Block 2 | Yes | - | - | - | - |  |  |
| Case 7 | Block 1 | - | - | - | - | Yes | Special cases? | Yes |
|  | Block 2 | - | - | - | - | Yes |  |  |
| Case 8 | Block 1 | - | - | - | Yes | - |  | Yes |
| Case 9 | Block 1 | - | - | - | - | - | Glitch? | Yes |

METHODS FOR ENCODING MOTION VECTORS

FIELD OF INVENTION

This invention generally relates to video encoding, and, in particular, methods and systems for encoding motion vectors of video data for a video bit stream.

BACKGROUND

The cost of transmitting data from one location to another can be a function of number of bits transmitted per second. Typically, higher bit transfer rates are associated with increased cost. Thus, video data is usually compressed before being transmitted into a bit stream. FIG. 1a illustrates a bit stream of video data. A bit stream 7 can comprise a sequence header 8, a picture header 10, a macroblock ("MB") header 12, MB coefficients 14 for the macroblock, and other MBs headers and coefficients (not shown). The MB header 12 includes control data and motion vectors for sub-blocks of the respective macroblock. Generally, efforts have been spent to reduce the bit rate of the bit stream 7 by reducing the number of motion vectors and the number of MB coefficients used for each of the MBs.

An encoder is a device capable of encoding (e.g., coding), and sometimes also decoding, digital media data. A decoder is a device capable of decoding digital media data. A codec is a device capable of coding and/or decoding digital media data. The term codec is derived from a combination of the terms code and decode, or the terms compress and decompress. A variety of codecs are commercially available. An encoder or codec, by encoding the digital media data, can reduce the number of bits required to transmit signals, which can thereby reduce associated transmission costs.

Certain video compression schemes can use a technique known as motion estimation as part of the encoding process to facilitate encoding video content. In many cases, consecutive video frames in a sequence of video frames can have similar content at different locations within the image frames due to the movement of an object(s) from one video frame to the next. Motion estimation techniques can take advantage of content similarities between consecutive video frames to more efficiently encode a video frame. For instance, an encoder, employing a region (block) based motion estimation technique, can use one block of a reconstructed previous video frame as a reference (e.g., predictor block) when encoding one block of a current video frame.

FIG. 1b illustrates a block diagram for encoding motion vectors of a video frame or field. Generally, frame data is inputted to a motion estimation block 16 to generate a motion vector for the block in the current video frame to indicate the location of the block in the reconstructed previous video frame that can be used as a predictor block for the block in current frame. Frame data can include the current video frame and one or more reference frames. An encoder 18 can then subtract the predictor block from the block in current video frame to form a residue block, and can code the residue block and the motion vector, rather than the original block of the current frame. This can thereby make the encoding process and decoding process more efficient.

For video compression schemes that use motion estimation, the bits used to encode motion vectors can make up a significant portion of compressed data. Therefore, it is desirable to provide new methods and systems for merging several motion vectors for encoding to improve the overall efficiency of video compression.

SUMMARY OF INVENTION

An object of this invention is to provide methods for encoding motion vectors of video data that can minimize the bit rate used for transmitting the motion vectors, while not significantly increasing the bit rate for pixel coefficients of the video data.

Another object of this invention is to provide methods for generating merged motion vectors for various sub-blocks of a macroblock to use in encoding.

Yet another object of this invention is to provide methods for merging motion vectors for sub-blocks of a macroblock as a function of sum of absolute difference calculations for the sub-blocks.

Briefly, the present invention discloses methods and systems for encoding motion vectors, comprising the steps of: determining motion vectors and flags for sub-blocks of a macroblock ("MB") as a function of SAD calculations for the MB; generating one or more merged motion vectors for the sub-blocks of the MB as a function of the determined motion vectors and the determined flags; generating a merged macroblock motion vector for the MB as a function of the generated merged motion vectors and of the determined flags; and encoding the determined motion vectors as a function of the generated merged motion vectors and the generated merged macroblock motion vector.

An advantage of this invention is that methods for encoding motion vectors of video data are provided that can minimize the overall bit rate used for transmission of the video data, while not significantly increasing the bit rate for pixel coefficients of the video data.

Another advantage of this invention is that methods for generating merged motion vectors for various sub-blocks of a macroblock to use in encoding are provided.

Yet another advantage of this invention is that methods for merging motion vectors for sub-blocks of a macroblock as a function of sum of absolute difference calculations for the sub-blocks are provided.

DESCRIPTION OF THE DRAWINGS

The foregoing and other objects, aspects, and advantages of the invention can be better understood from the following detailed description of the preferred embodiment of the invention when taken in conjunction with the accompanying drawings.

FIG. 6 illustrates sub-blocks of a macroblock for merging using a method of the present invention.

FIG. 7 illustrates a chart of the present invention for merging blocks of a macroblock.

DETAILED DESCRIPTION OF THE PREFERRED EMBODIMENTS

In the following detailed description of the embodiments, reference is made to the accompanying drawings, which form a part hereof, and in which is shown by way of illustration of specific embodiments in which the present invention may be practiced. It is understood by a person having ordinary skill in the art that sub-blocks and blocks used in the following examples can comprise a wide ranging number of pixels. Also, the sub-blocks can be shifted from other sub-blocks by a fraction of a pixel or by integer values of the pixels. Additionally, the SAD calculations can be weighted according to various methods for determining SAD calculations to compare two sub-blocks to each other. The examples herein are not meant to be limiting in any manner, and are for illustration purposes only.

Figure 1A:
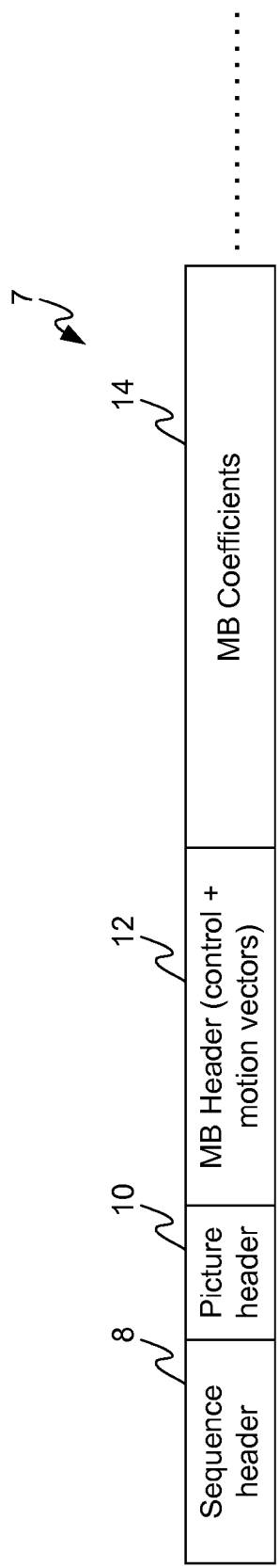
FIG. 1a illustrates a bit stream of video data.
Figure 1B:
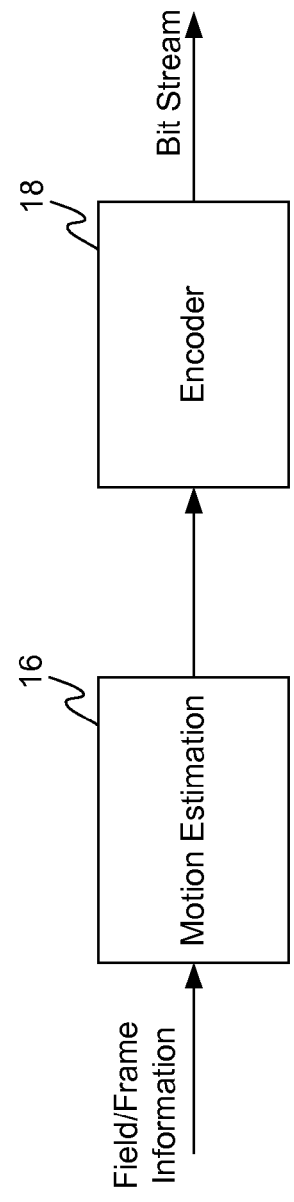
FIG. 1b illustrates a block diagram for encoding motion vectors of a video frame or field.
Figure 2:
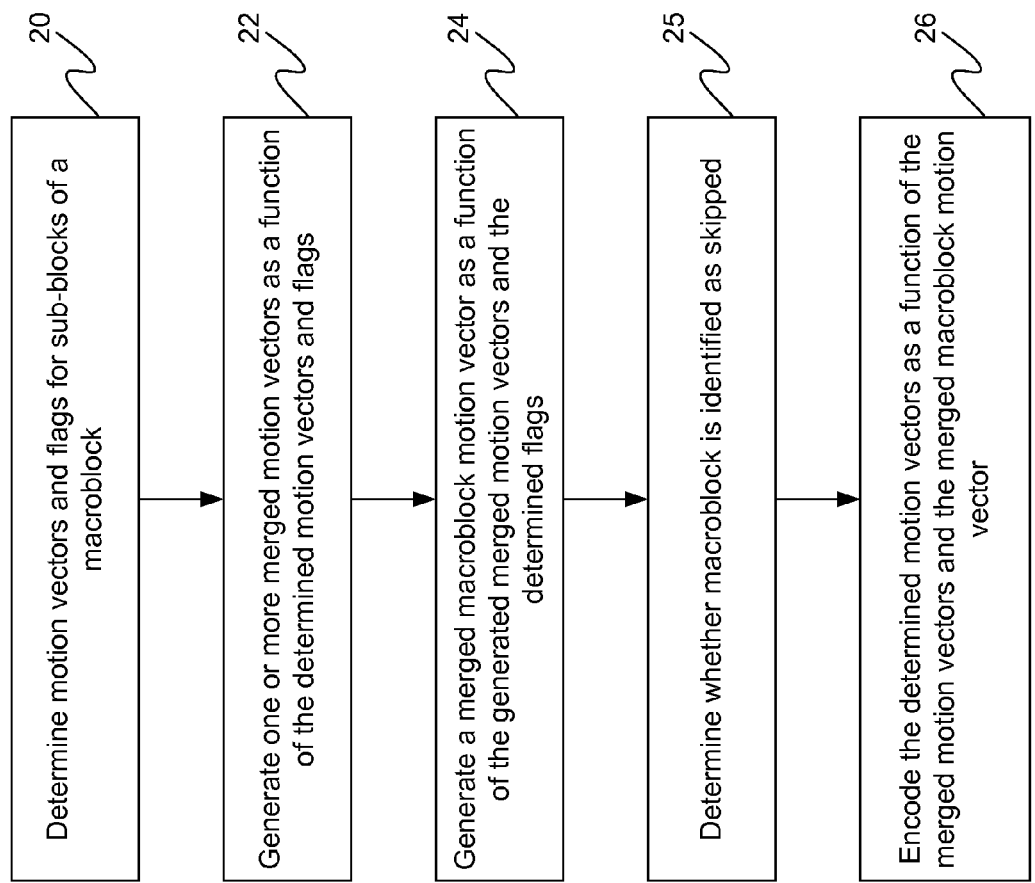
FIG. 2 illustrates a flow chart of the present invention for encoding motion vectors of a macroblock of video data.

FIG. 2 illustrates a flow chart of the present invention for encoding motion vectors of a macroblock of video data. For encoding motion vectors, a motion estimation block can provide motion vectors and flags for each of the sub-blocks of a macroblock 20. A video frame or field can be partitioned into several macroblocks, where each macroblock is about 16-pixels by 16-pixels. The macroblock can be further partitioned into several sub-blocks that are each about 4-pixels by 4-pixels. Thus, for a macroblock, there are 16 sub-blocks giving 16 motion vectors and 16 sets of flags.

In particular, for each of the sub-blocks of the macroblock in a current frame, sum of absolute difference ("SAD") calculations are performed to select one or more similar corresponding blocks within a reference frame. Flags to indicate various thresholds for those calculated SAD calculations can also be generated to provide further information regarding the selected corresponding block(s).

Once motion vectors and flags are determined, one or more merged motion vectors can be generated 22 as a function of the determined motion vectors and flags. For instance, if two 4×4 sub-blocks are compatible for merging, then a single 4×8 or 8×4 merged block can be generated. The merged block can have a merged motion vector and flags that can be used for further merging with other blocks in its vicinity having the same size.

If there are two 4×8 merged blocks side-by-side, then those two merged blocks can be further merged to form an 8×8 merged block. The 8×8 merged block can have a merged motion vector and flags that are a function of the two 4×8 merged blocks' motion vectors and respective flags. By using a single merged motion vector to represent multiple sub-blocks, the number of bits that need to be used for encoding the merged motion vector can be reduced.

This process can continue until the respective macroblock has a single merged motion vector. For instance, if a macroblock has four 8×8 merged blocks and the merged blocks are compatible for merging, then the macroblock can be merged to a single merged motion vector. A merged macroblock motion vector for the macroblock can be generated as a function of the generated merged motion vectors of those blocks and the determined flags 24.

If there is a single merged MB motion vector, then that merged MB motion vector is compared to merged MB motion vectors of other neighboring macroblocks. If the single merged MB motion vector is close to the merged MB motion vectors of the other neighboring macroblocks, then the single merged MB motion vector is identified as a skipped motion vector 25. The skipped motion vector can equal one of the merged MB motion vectors of the neighboring blocks.

For instance, if a current macroblock is merged into having a single merged MB motion vector, MBMV1 and if there are other neighboring macroblocks that also have merged motion vectors, then a median merged MB motion vector is selected from the neighboring macroblocks. If the absolute difference of the MBMV1 and the median merged MB motion vector is below a threshold (which can be user defined and configured), then the MBMV1 can be identified as a skipped motion vector and can be equal to the median merged MB motion vector.

Any merged macroblock motion vector and any merged motion vectors can be used for encoding, instead of using motion vectors for each of the smaller sub-blocks. In this manner, the determined motion vectors can be encoded as a function of the merged motion vectors and the merged macroblock motion vector 26. This method can be repeated for additional macroblocks of the video data.

Figure 3:
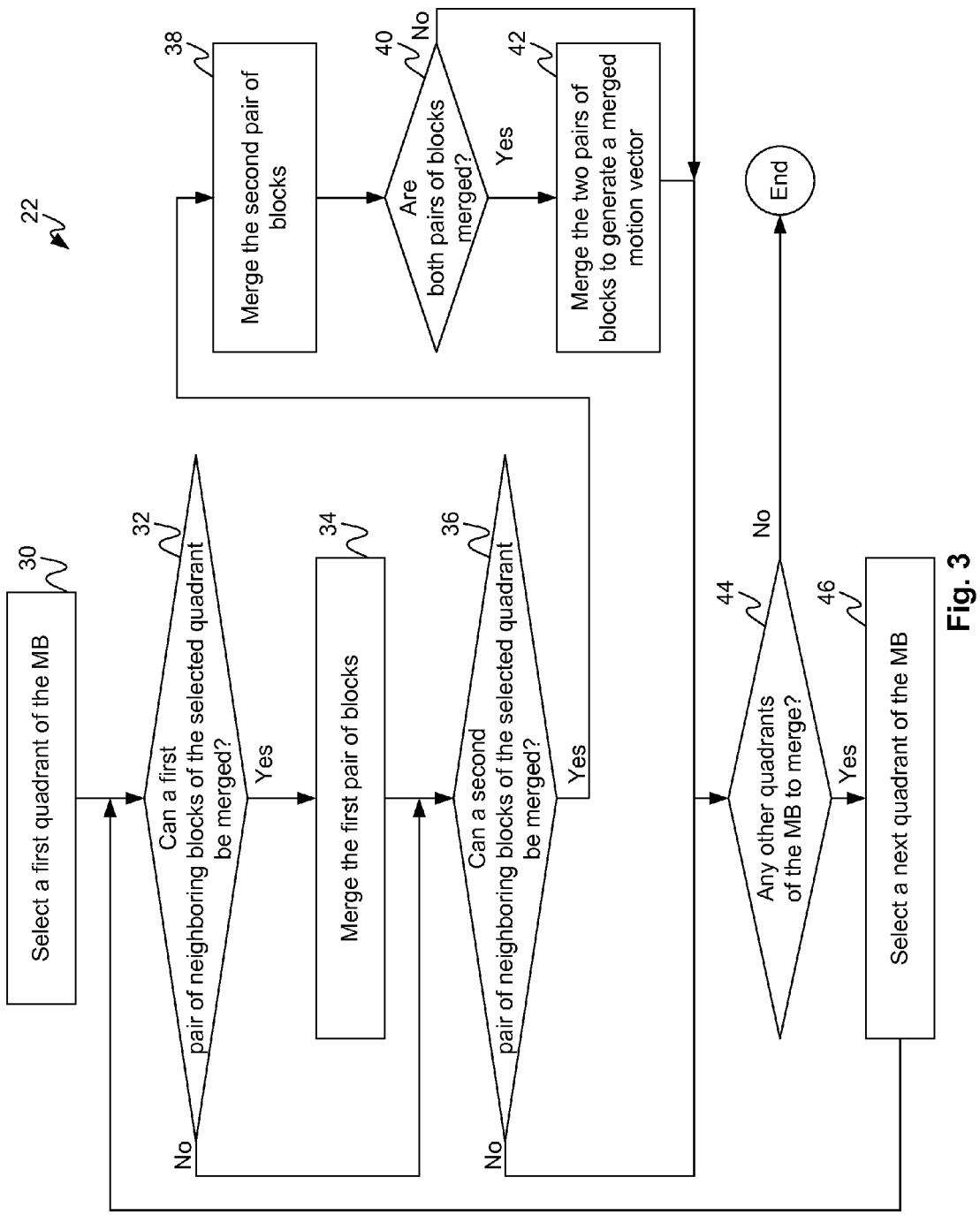
FIG. 3 illustrates a flow chart of the present invention for merging sub-blocks of a macroblock of video data for encoding.

FIG. 3 illustrates a flow chart of the present invention for merging sub-blocks of a macroblock of video data for encoding. In order to generate one or more merged motion vectors 22, a first quadrant of the macroblock is selected for merging 30. The macroblock can comprise four quadrants of equal size, where each quadrant is 8×8 pixels and has 4 sub-blocks of 4×4 pixels.

For the selected quadrant, it is determined whether a first pair of neighboring sub-blocks of the selected quadrant can be merged 32 by meeting merging requirements. If so, the first pair of sub-blocks is merged 34. If not, the merging step 34 is skipped. The next step is to determine whether a second pair of sub-blocks of the selected quadrant can be merged 36. If so, the second pair of sub-blocks is merged 38. If not, it is determined whether there are any other quadrants of the MB that can be merged 44.

If a second pair of neighboring blocks can be merged, then the second pair of blocks is merged 38. Next, it is determined whether both pairs of blocks in the selected quadrant have been merged 40. If so, then the two pairs of blocks are merged to generate a merged motion vector 42 if the two pairs meet the merging requirements. If not, then it is determined whether there are any other quadrants of the MB that can be merged 44.

If there are no other quadrants to process, then the generating step 22 ends. If there are, then a next quadrant of the MB is processed to determine if its sub-blocks can be merged by starting at determining whether a first pair of neighboring blocks of the selected quadrant can be merged 32.

Although the above example describes sequential processing of the quadrants for merging, it is understood by a person having ordinary skill in the art that the quadrants can be processed in parallel for shorter processing time.

Figure 4:
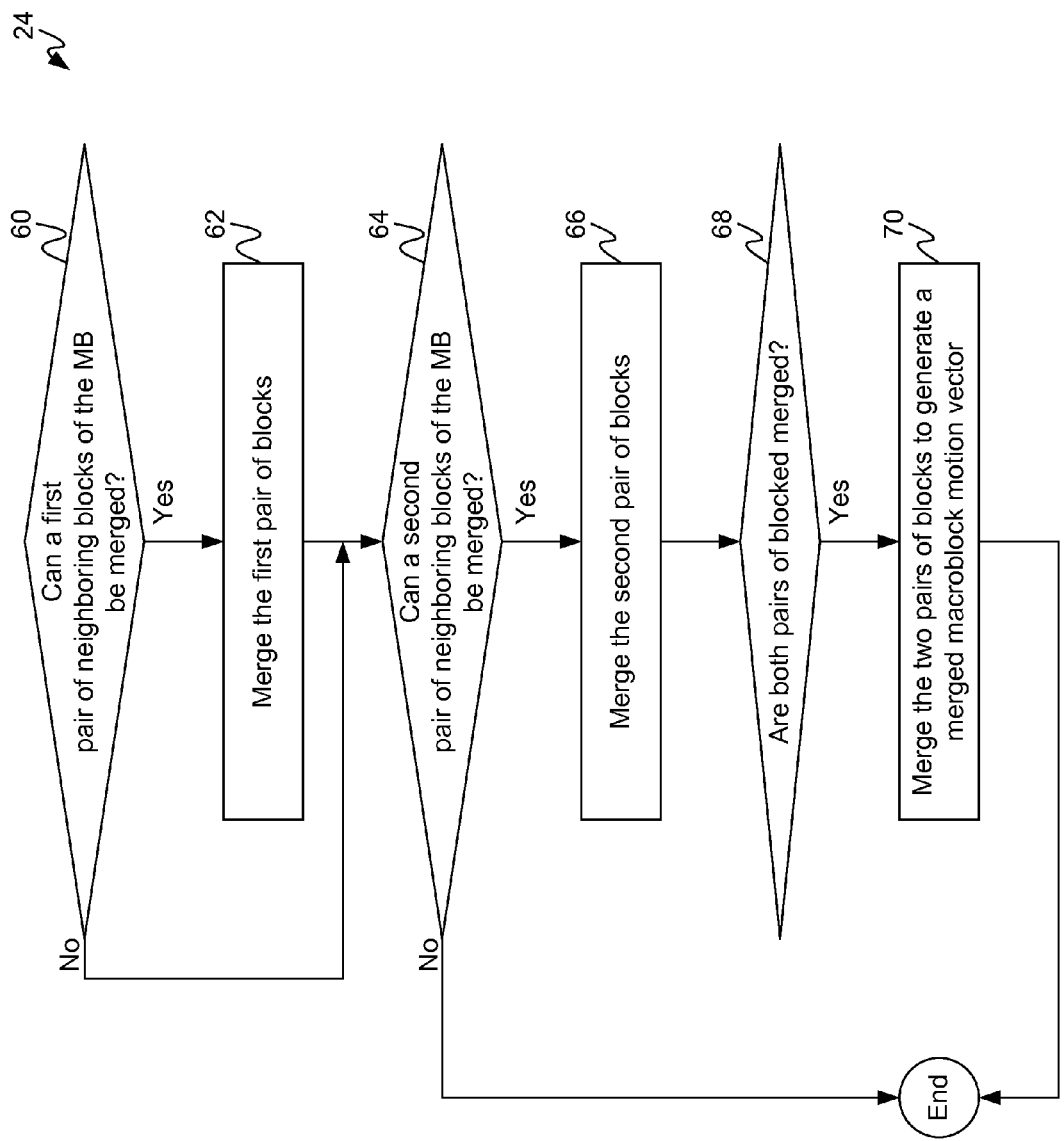
FIG. 4 illustrates a flow chart of the present invention for merging quadrants of a macroblock of video data for encoding.

FIG. 4 illustrates a flow chart of the present invention for merging quadrants of a macroblock of video data for encoding. In order to generate a merged macroblock motion vector 24, it is determined whether a first pair of neighboring blocks of the MB can be merged 60. If so, then the first pair of blocks can be merged 62. If not, the merging step 62 is skipped.

Next, it is determined whether a second pair of neighboring blocks of the MB can be merged 64. If so, then the second pair of blocks is merged 66. If not, then the generating step 24 ends. If the second pair is merged, then it is determined whether both pairs of blocks in the MB are merged 68. If so, the two pairs of blocks are merged 70 to generate a merged macroblock motion vector to correspond to the entire macroblock if the two pairs meet merging requirements. The generated merged macroblock motion vector can be encoded to correspond to the entire macroblock (rather than have 16 motion vectors correspond to the sub-blocks of the macroblock). In this manner, fewer bits are needed to encode motion vectors of the macroblock.

Figure 5:
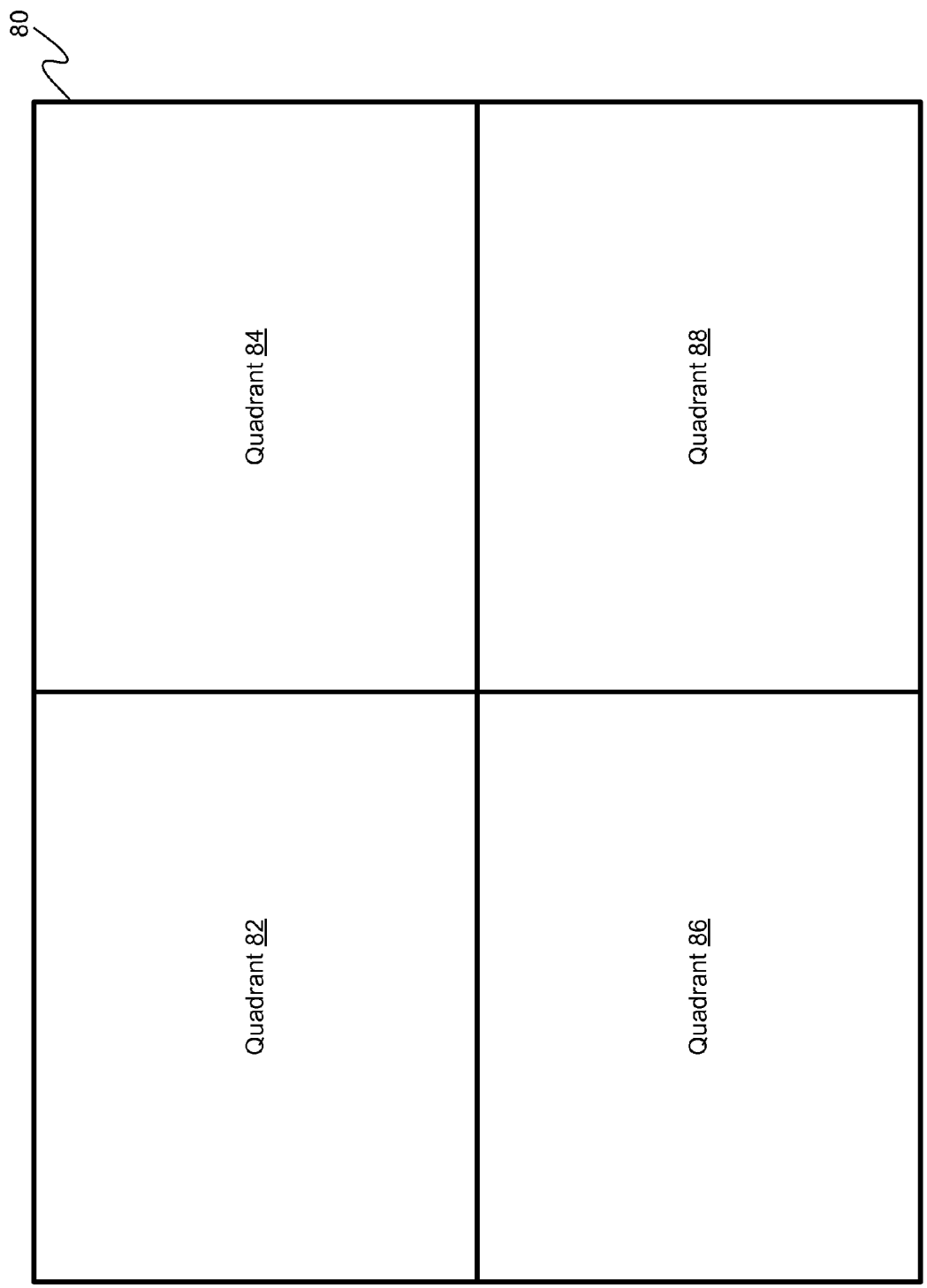
FIG. 5 illustrates quadrants of a macroblock of the present invention.

FIG. 5 illustrates quadrants of a macroblock of the present invention. A macroblock 80 of the present invention can comprise of four equal quadrants 82-88, where each quadrant has four sub-blocks of 4×4 pixels. If each of the quadrants 82-88 has one merged motion vector, then the quadrants 82-88 can be further merged to generate fewer motion vectors to represent sub-blocks within the macroblock 80.

If the merging conditions are met, then two neighboring quadrants can be merged. Neighboring quadrants that can be merged include a first pair of quadrants comprising quadrant 82 and quadrant 84 and a second pair of quadrants comprising quadrant 86 and quadrant 88, or alternatively, a first pair of quadrants comprising quadrant 82 and quadrant 86 and a second pair of quadrant 84 and quadrant 88.

In determining whether a first pair of quadrants can be merged, the first pair of quadrants comprising quadrant 82 and quadrant 84 can be checked first. If that pair does not meet merging requirements, then the other first pair of quadrants comprising quadrant 82 and quadrant 86 can be checked. Depending on the spatial orientation of the first pair, the respective second pair corresponding to such orientation can be determined as to whether the second pair can be merged.

FIG. 6 illustrates sub-blocks of a macroblock for merging using a method of the present invention. Each quadrant of a macroblock of the present invention can comprise of four equal sub-blocks 90-96, where each sub-block is 4×4 pixels. If merging conditions are met between two neighboring sub-blocks of the sub-blocks 90-96, then the two neighboring sub-blocks are merged. Neighboring sub-blocks that can be merged include a first pair of sub-blocks comprising sub-block 90 and sub-block 92 and a second pair of sub-blocks comprising sub-block 94 and sub-block 96, or alternatively, a first pair of sub-blocks comprising sub-block 90 and sub-block 94 and a second pair of sub-blocks comprising sub-block 92 and sub-block 96.

In determining whether a first pair of sub-blocks can be merged, the first pair of quadrants comprising sub-block 90 and sub-block 92 can be checked first. If that pair does not meet merging requirements, then the other first pair of sub-blocks comprising sub-blocks 90 and sub-block 94 can be checked. Depending on the spatial orientation of the first pair, the respective second pair corresponding to such orientation can be determined as to whether the second pair can be merged.

For instance, if the first pair of sub-blocks 90 and 92 can be merged, then a merged motion vector and flags can be generated for a merged sub-block 98. Also, if the second pair of sub-blocks 94 and 96 can be merged, then another merged motion vector and flags can be generated for a merged sub-block 100. Furthermore, the two merged sub-blocks 98 and 100 can be further merged if those two merged sub-blocks 98 and 100 meet merging requirements. If those two do, then yet another merged motion vector and flags can be generated to represent the entire quadrant that comprises the sub-blocks 90-96. Therefore, for encoding purposes, instead of having four motion vectors (one for each of the sub-blocks 90-96) to encode, the methods of the present invention can use a single merged motion vector for all of the sub-blocks 90-96. This can greatly reduce the bit rate of the respective video bit stream.

Additionally, the sub-blocks 90-96 can be determined for merging directly into the merged sub-block 102 rather than sequentially testing each pair of sub-blocks. Furthermore, it is understood by a person having ordinary skill in the art that multiple cases can be determined in parallel depending on the hardware and/or software capabilities of the respective system. For instance, the respective system can have logic to test for all of the following: (1) whether sub-blocks 90 and 92 can be merged; (2) whether sub-blocks 94 and 96 can be merged; (3) whether sub-blocks 90 and 94 can be merged; (4) whether sub-blocks 92 and 96 can be merged; and (5) whether sub-blocks 90-96 can be merged. Based on the results of the above cases, the respective system can process the merging accordingly.

FIG. 7 illustrates a merging chart of the present invention for merging blocks of a macroblock. When comparing two neighboring blocks (whether that be two neighboring sub-blocks, two neighboring quadrants, or other sized blocks for merging), several conditions can be set to determine if the two neighboring blocks can be merged.

As previously discussed, for each of the sub-blocks a motion estimation block can calculate a motion vector and various flags to indicate various information regarding the motion vector. Typically, a motion vector is calculated for a current sub-block of a current frame to provide a location of a reference sub-block within a reference frame by applying SAD calculations between the current sub-block and various sub-blocks of a search area within the reference frame. The sub-block in the search area corresponding to the minimal SAD calculation is determined to be the reference sub-block for that particular current sub-block of the current frame.

In addition to determining a motion vector, the SAD calculations can also be used to determine whether a particular flag should be initialized. A flexible flag can be initialized for a sub-block to be encoded if the reference sub-block in the reference frame can be slightly shifted without greatly affecting its SAD calculation, i.e., the sub-block in the reference frame is shiftable. A big flag can be initialized for a sub-block to be encoded if the minimum SAD calculation for the search area is greater than a predefined threshold. This can mean that there isn't a similar block to the sub-block to be encoded in the search area of the reference frame. An any flag can be initialized for a sub-block to be encoded if the maximum SAD calculation for the search area is below a predefined threshold.

A 1-MV merge flag can be initialized if the motion vector for the sub-block is identified as skippable. The 1-MV merge flag is initialized if some or all of the other blocks of the respective macroblock have been merged. The remaining blocks to be checked for merging can have their 1-MV merge flags initialized so that their motion vector is equal to the merged motion vectors of the other merged block(s) in the respective macroblock. A fixed flag can be initialized if the flexible, big, and any flags are not initialized. The predefined thresholds are configurable to meet system requirements and quality control. A person having ordinary skill in the art can define such thresholds based on the present disclosure.

If blocks are merged, then the merged block can also have a flexible flag, a big flag, an any flag, a 1-MV merge flag, and a fixed flag associated with that merged block. These flags can be generated based on the flags of the blocks used for merging. The worst case flag for each of the blocks can be inherited by the merged block. The worst case flag can be further inherited by any other merged blocks that use that merged block. The worst case flag can be in the following order of priority: a fixed flag, a flexible flag, a big flag, and any flag, where a fixed flag has the highest priority to be inherited and order of priority following from there. The 1-MV merge flag is a function of the respective macroblock. Thus, one or more sub-blocks or a merged block in the same macroblock may be assigned a 1-MV merge flag depending on whether the rest of the macroblock was merged. For instance, if a first block has an any flag associated with it, a second block has a flexible flag associated with it, and the first block and second block are merged, then the resulting merged block has the worst case flag associated with it, which in this case is the flexible flag. If the merged block is used to merge with another block, then the flexible flag of the merged bock will be compared with the other block's flags for inheritance.

For two neighboring blocks (e.g., block 1 and block 2), the determined motion vector and flags for each of the blocks 1 and 2 can be used to merge blocks 1 and 2. Furthermore, with these fundamental merging conditions as set forth below, other blocks of different sizes (e.g., quadrants, or blocks of other sizes) can be merged as well using the motion vectors and flags of those blocks.

In a first case, if block 1 has its fixed flag initialized, block 2 has its flexible flag initialized, and the absolute difference of the motion vector for block 1 and the motion vector for block 2 is below a predefined threshold, then a merged motion vector for block 1 and block 2 is generated. The merged motion vector can equal the motion vector for the block 1, which has the fixed flag initialized. Also, the fixed flag can be inherited from block 1 and initialized for the resulting merged block.

In a second case, if block 1 and block 2 both have their respective flexible flags initialized and the absolute difference of the motion vector for block 1 and the motion vector for block 2 is below a predefined threshold, then a merged motion vector for block 1 and block 2 is generated. The merged motion vector can equal the average of the motion vector for block 1 and the motion vector for block 2. Also, the flexible flag can be inherited and initialized for the resulting merged block.

In a third case, if block 1 has either its flexible flag initialized or its fixed flag initialized and block 2 has its any flag initialized, then a merged motion vector for block 1 and block 2 is generated. The merged motion vector can equal the motion vector for block 1. Also, the flexible flag or fixed flag of block 1 can be inherited and initialized for the resulting merged block.

In a fourth case, if both block 1 and block 2 have their respective any flag initialized, then a merged motion vector for block 1 and block 2 is generated. The merged motion vector can equal the average of the average of the motion vector for block 1 and the motion vector for block 2. Also, the any flag can be inherited and initialized for the resulting merged block.

In a fifth case, if block 1 has its big flag initialized (meaning that the minimum SAD calculation is greater than a predefined threshold), then the big flag can be treated as an any flag. Therefore, this case can revert to either the third case or the fourth case, depending on the flags for block 2.

Furthermore, a big flag can have sub-levels that can be configured to handle more cases. For instance, assuming the following thresholds thres1, 2, and 3 are determined and thres3>thres2>thres1, then the big flag can be identified as extremely big when the minimum SAD for the sub-block is greater than thres3. If the big flag is identified as extremely big, then the big flag can be treated as an any flag being initialed and used accordingly for merging block 1 and block 2. If the big flag is identified as very big (i.e., thres3>minimum SAD>thres2), then the big flag can be treated as a flexible flag being initialized and used accordingly for merging. If the big flag is identified as big (i.e., thres2>minimum SAD>thres1), then the big flag can be treated as a fixed flag being initialized and used accordingly for merging. A person having ordinary skill in the art can define such thresholds based on the present disclosure.

In a sixth case, if an any flag is initialized for block 1 and the flexible flag is initialized for block 2, then a merged motion vector for block 1 and block 2 is generated. The merged motion vector can equal the motion vector for block 2. Also, the flexible flag can be inherited and initialized for the resulting merged block.

In a seventh case, if blocks 1 and 2 have their fixed flags initialized, blocks 1 and 2 can be merged if one of the following are true:
  a) Motion vector of block 1("MV1")=motion vector of block 2("MV2"); or
  b) |MV1−MV2|<thres4.

For item (a) or item (b), the merged motion vector can equal either MV1 or MV2 since MV1 and MV2 are equal or just about equal. For item (c), the merged motion vector of block 1 and block 2 can equal another merged motion vector of another merged neighboring block.

In an eighth case, if a 1-MV merge flag is initialized for a block 1, then the motion vector for block 1 can be merged to a merged motion vector of the macroblock. This case can be referred to as a 1-MV merge condition.

In a ninth case, if a motion vector for block 1 (and/or another block) is far away from the range of motion vectors for other blocks in the respective macroblock, then then the motion vector for block 1 can be disregarded by initializing an any flag for block 1. In essence, the motion vector is not used and is assigned a motion vector of one or more of its neighboring blocks. This case can be referred to as a glitch remove case.

Thereby, every sub-block of a macroblock of the current frame can have a corresponding motion vector and any applicable flags initialized for that sub-block. As discussed above, the motion vectors and the flags are used to determine whether respective neighboring blocks can be merged.

While the present invention has been described with reference to certain preferred embodiments or methods, it is to be understood that the present invention is not limited to such specific embodiments or methods. Rather, it is the inventor's contention that the invention be understood and construed in its broadest meaning as reflected by the following claims. Thus, these claims are to be understood as incorporating not only the preferred apparatuses, methods, and systems described herein, but all those other and further alterations and modifications as would be apparent to those of ordinary skilled in the art.

I claim:

1. A method for encoding motion vectors, comprising the steps of:
   determining motion vectors and flags for sub-blocks of a macroblock ("MB") as a function of SAD calculations for the MB;
   generating one or more merged motion vectors for the sub-blocks of the MB as a function of the determined motion vectors and the determined flags;
   generating a merged macroblock motion vector for the MB as a function of the generated merged motion vectors and of the determined flags; and
   encoding the determined motion vectors as a function of the generated merged motion vectors and the generated merged macroblock motion vector,
   wherein each of the determined motion vectors correspond to a reference block in a reference frame having a minimum of the SAD calculations for the respective sub-block of the MB for the each of the determined motion vectors, wherein the determined flags for each of the sub-blocks of the MB comprise a flexible flag, a big SAD flag, an any flag, a 1-MV merge flag, and a fixed flag for each of the sub-blocks of the MB, wherein the flexible flag indicates that the reference block is shiftable, wherein the any flag indicates that a SAD value for a shifted sub-block in the reference frame is below a first predefined threshold, wherein the 1-MV merge flag indicates whether other blocks in the MB have been merged, and wherein the fixed flag is initialized when the flex flag, the any flag, and the 1-MV merge flag are not initialized.

2. The method of claim 1 wherein the motion vectors of certain ones of the sub-blocks in the MB are merged if the following are met:
(A) the fixed flag is initialized for a first one of the certain ones of the sub-blocks of the MB;
(B) the flexible flag is initialized for a second one of the certain ones of the sub-blocks of the MB; and
(C) an absolute motion vector difference between the motion vectors of the first one and the second one of the certain ones of the sub-blocks of the MB is below a first predefined threshold.

3. The method of claim 2 wherein if the motion vectors of the certain ones of the sub-blocks of the MB are merged, then the merged motion vector for the certain ones of the sub-blocks of the MB is equal to the motion vector for the first one of the certain ones of the sub-blocks of the MB.

4. The method of claim 1 wherein the motion vectors of certain ones of the sub-blocks in the MB are merged if the following are met:
(A) the flexible flag is initialized for each of the certain ones of the sub-blocks of the MB; and
(B) an absolute motion vector difference between the motion vectors of the first one and the second one of the certain ones of the sub-blocks of the MB is below a first predefined threshold.

5. The method of claim 4 wherein if the motion vectors of the certain ones of the sub-blocks of the MB are merged, then the merged motion vector for the certain ones of the sub-blocks of the MB is equal to an average motion vector of the motion vectors for the certain ones of the sub-blocks of the MB.

6. The method of claim 1 wherein the motion vectors of certain ones of the sub-blocks in the MB are merged if the following are met:
(A) the fixed flag or the flexible flag is initialized for a first one of the certain ones of the sub-blocks of the MB; and
(B) the any flag is initialized for a second one of the certain ones of the sub-blocks of the MB.

7. The method of claim 6 wherein if the motion vectors of the certain ones of the sub-blocks of the MB are merged, then the merged motion vector for the certain ones of the sub-blocks of the MB is equal to the motion vector for the first one of the certain ones of the sub-blocks of the MB.

8. The method of claim 1 wherein the motion vectors of certain ones of the sub-blocks in the MB are merged if the following:
(A) the any flag is initialized for each of the certain ones of the sub-blocks of the MB.

9. The method of claim 8 wherein if the motion vectors of the certain ones of the sub-blocks of the MB are merged, then the merged motion vector for the certain ones of the sub-blocks of the MB is equal to an average motion vector of the motion vectors for the certain ones of the sub-blocks of the MB.

10. The method of claim 1 wherein the motion vectors of certain ones of the sub-blocks in the MB are merged if the following are met:
(A) the big flag for a first one of the certain ones of the sub-block of the MB is greater than a second predefined threshold; and
(B) the fixed or flexible flag is initialized for a second one of the certain ones of the sub-blocks of the MB.

11. The method of claim 10 wherein if the motion vectors of the certain ones of the sub-blocks of the MB are merged and the big flag is initialized for the second one of the certain ones of the sub-blocks of the MB, then the merged motion vector for the certain ones of the sub-blocks of the MB is equal to the motion vector for the second one of the certain ones of the sub-blocks of the MB.

12. The method of claim 10 wherein if the motion vectors of the certain ones of the sub-blocks of the MB are merged and the flexible flag is initialized for the second one of the certain ones of the sub-blocks of the MB, then the merged motion vector for the certain ones of the sub-blocks of the MB is equal to an average motion vector of the motion vectors for the certain ones of the sub-blocks of the MB.

13. The method of claim 1 wherein the motion vectors of certain ones of the sub-blocks of the MB are merged if the following are met:
fixed flags are initialized for the certain ones of the sub-blocks of the MB; and
one of the following are met:
motion vectors of the certain ones are equal; or
absolute difference of the certain ones is less than a predefined threshold value.

14. The method of claim 1 wherein the motion vectors of certain ones of the sub-blocks of the MB are merged if the following are met:
(A) an absolute difference between a reference motion vector of a reference frame and each of the motion vectors of the certain ones of the sub-blocks of the MB is below a second predefined threshold.

15. The method of claim 14 wherein the merged motion vector for the certain ones of the sub-blocks of the MB is equal to the reference motion vector.

16. The method of claim 1 wherein if one or more certain ones of the motion vectors of the sub-blocks of the MB are outside a range from an average motion vector of the motion vectors of the sub-blocks of the MB, then the one or more certain ones of the motion vectors of the sub-blocks of the MB is merged, and wherein the merged motion vector for the certain ones of the sub-blocks of the MB is equal to the average motion vector.

17. The method of claim 1 wherein if the generated merged macroblock motion vector is within a predefined range of merged macroblock motion vectors of neighboring macroblocks, then the generated merged macroblock motion vector is equal to a median motion vector of the merged macroblock motion vectors of the neighboring macroblocks.

18. A method for encoding motion vectors, comprising the steps of:
determining motion vectors and flags for sub-blocks of a macroblock ("MB") as a function of SAD calculations for the MB;
generating one or more merged motion vectors for the sub-blocks of the MB as a function of the determined motion vectors and the determined flags;
generating a merged macroblock motion vector for the MB as a function of the generated merged motion vectors and of the determined flags; and encoding the determined motion vectors as a function of the generated merged motion vectors and the generated merged macroblock motion vector, wherein the determined flags for each of the sub-blocks of the MB comprise a flexible flag, a big SAD flag, an any flag, a 1-MV merge flag, and a fixed flag for each of the sub-blocks of the MB, wherein the flexible flag indicates that the reference block is shiftable, wherein the any flag indicates that a SAD value for a shifted sub-block in the reference frame is below a first predefined threshold, wherein the 1-MV merge flag indicates whether other blocks in the MB have been merged, wherein the fixed flag is initialized when the flex flag, the any flag, and the 1-MV merge flag are not initialized, wherein the motion vectors of certain ones of the sub-blocks in the MB are merged if the following are met:
   the fixed flag is initialized for a first one of the certain ones of the sub-blocks of the MB;
   the flexible flag is initialized for a second one of the certain ones of the sub-blocks of the MB; and
   an absolute motion vector difference between the motion vectors of the first one and the second one of the certain ones of the sub-blocks of the MB is below a first predefined threshold, wherein the motion vectors of certain ones of the sub-blocks in the MB are merged if the following are met:
   the flexible flag is initialized for each of the certain ones of the sub-blocks of the MB; and
   an absolute motion vector difference between the motion vectors of the first one and the second one of the certain ones of the sub-blocks of the MB is below a first predefined threshold, wherein the motion vectors of certain ones of the sub-blocks in the MB are merged if the following are met:
   the fixed flag or the flexible flag is initialized for a first one of the certain ones of the sub-blocks of the MB; and
   the any flag is initialized for a second one of the certain ones of the sub-blocks of the MB, wherein the motion vectors of certain ones of the sub-blocks in the MB are merged if the following:
   the any flag is initialized for each of the certain ones of the sub-blocks of the MB, wherein the motion vectors of certain ones of the sub-blocks in the MB are merged if the following are met:
   the big flag for a first one of the certain ones of the sub-block of the MB is greater than a second predefined threshold; and
   the fixed or flexible flag is initialized for a second one of the certain ones of the sub-blocks of the MB, wherein the motion vectors of certain ones of the sub-blocks of the MB are merged if the following are met:
   fixed flags are initialized for the certain ones of the sub-blocks of the MB; and
   one of the following are met:
     motion vectors of the certain ones are equal; or
     absolute difference of the certain ones is less than a predefined threshold value, wherein the motion vectors of certain ones of the sub-blocks of the MB are merged if the following are met:
   an absolute difference between a reference motion vector of a reference frame and each of the motion vectors of the certain ones of the sub-blocks of the MB is below a second predefined threshold, wherein if one or more certain ones of the motion vectors of the sub-blocks of the MB are outside a range from an average motion vector of the motion vectors of the sub-blocks of the MB, then the one or more certain ones of the motion vectors for the sub-blocks of the MB is merged, and wherein if the generated merged macroblock motion vector is within a predefined range of merged macroblock motion vectors of neighboring macroblocks, then the generated merged macroblock motion vector is equal to a median motion vector of the merged macroblock motion vectors of the neighboring macroblocks.

* * * * *